US009442769B2

(12) United States Patent
Ferris

(10) Patent No.: US 9,442,769 B2
(45) Date of Patent: Sep. 13, 2016

(54) GENERATING CLOUD DEPLOYMENT TARGETS BASED ON PREDICTIVE WORKLOAD ESTIMATION

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 255 days.

(21) Appl. No.: 13/250,251

(22) Filed: Sep. 30, 2011

(65) Prior Publication Data
US 2013/0086235 A1      Apr. 4, 2013

(51) Int. Cl.
*G06F 9/50*      (2006.01)

(52) U.S. Cl.
CPC ....... *G06F 9/505* (2013.01); *G06F 2209/5019* (2013.01)

(58) Field of Classification Search
USPC ......................................... 709/223, 224, 226
See application file for complete search history.

(56) References Cited

U.S. PATENT DOCUMENTS

| | | | | |
|---|---|---|---|---|
| 2008/0080396 A1* | 4/2008 | Meijer | ............... | H04L 12/66 370/254 |
| 2008/0172673 A1* | 7/2008 | Naik | ............... | G06F 9/505 718/104 |
| 2008/0201253 A1* | 8/2008 | Gray | ............... | G06Q 40/04 705/37 |
| 2010/0235355 A1* | 9/2010 | Carter | ............... | G06F 9/505 707/736 |
| 2011/0145392 A1* | 6/2011 | Dawson | ............... | G06F 9/505 709/224 |

\* cited by examiner

*Primary Examiner* — Natisha Cox
(74) *Attorney, Agent, or Firm* — Lowenstein Sandler LLP

(57) ABSTRACT

Embodiments relate to systems and methods for generating cloud deployment targets based on predictive workload estimation. In aspects, a set of usage histories can store records for user workloads in a host cloud-based network recording the consumption of processor, memory, storage, operating system, application, or other resources subscribed to by the user. The operator of the cloud management system hosting the workloads of one or more users can track, identify, and manage the predictive marginal resource capacities of the set of host clouds, based on those historical usage patterns. The collective usage history can indicate, for instance, that a number of operating workloads tend to display a small under-utilization of processor or memory resources during certain overnight periods on a regular basis. The operator can then harvest those predictive marginal capacities, and offer a new user or workload a potential hosting subscription based on those expected resource availabilities.

21 Claims, 5 Drawing Sheets

US 9,442,769 B2

GENERATING CLOUD DEPLOYMENT TARGETS BASED ON PREDICTIVE WORKLOAD ESTIMATION

FIELD

The invention relates generally to systems and methods for generating cloud deployment targets based on predictive workload estimation, and more particularly, to platforms and techniques for identifying, capturing, and aggregating underutilized cloud resources in clouds hosting one or more operating workloads, and leveraging those marginal resource capacities in subscription offers to additional users or workloads.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent clouds to support the user's cloud deployment. That user may further instantiate and use multiple applications or other software or services inside or across multiple of those cloud boundaries, and those resources may be used or consumed by multiple or differing end-user groups in those different cloud networks.

In terms of operating efficiency for cloud operators, the workloads hosted by various clouds may not exhibit constant or unchanging demands on the resources of their host clouds. In cases, a workload may demonstrate a tendency to require less than the fully subscribed levels of resources over certain periods. Across the entire collection of operating workloads and entire collection of cloud resources, these temporarily underutilized resources may represent a significant portion of the clouds' total capacities, which may lie in a predictably idle state during certain intervals of time. It may be desirable to provide systems and methods for generating cloud deployment targets based on predictive workload estimation, in which temporarily underutilized host cloud resources can be captured in a set of predictive marginal capacities that can be re-used by new or existing workloads.

DESCRIPTION

Figure 1:
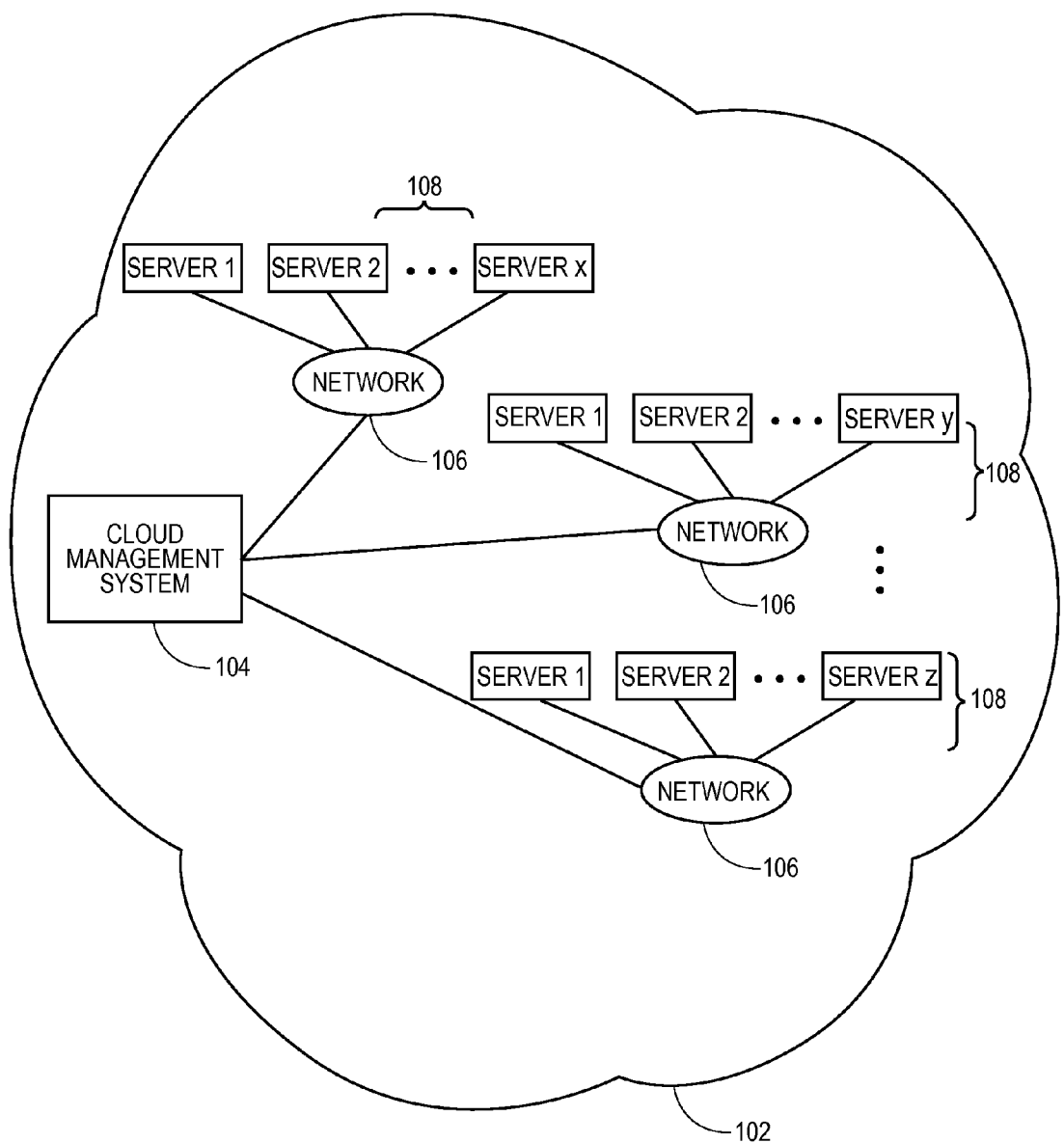
FIG. 1 illustrates an overall cloud system architecture in which various aspects of systems and methods for generating cloud deployment targets based on predictive workload estimation can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
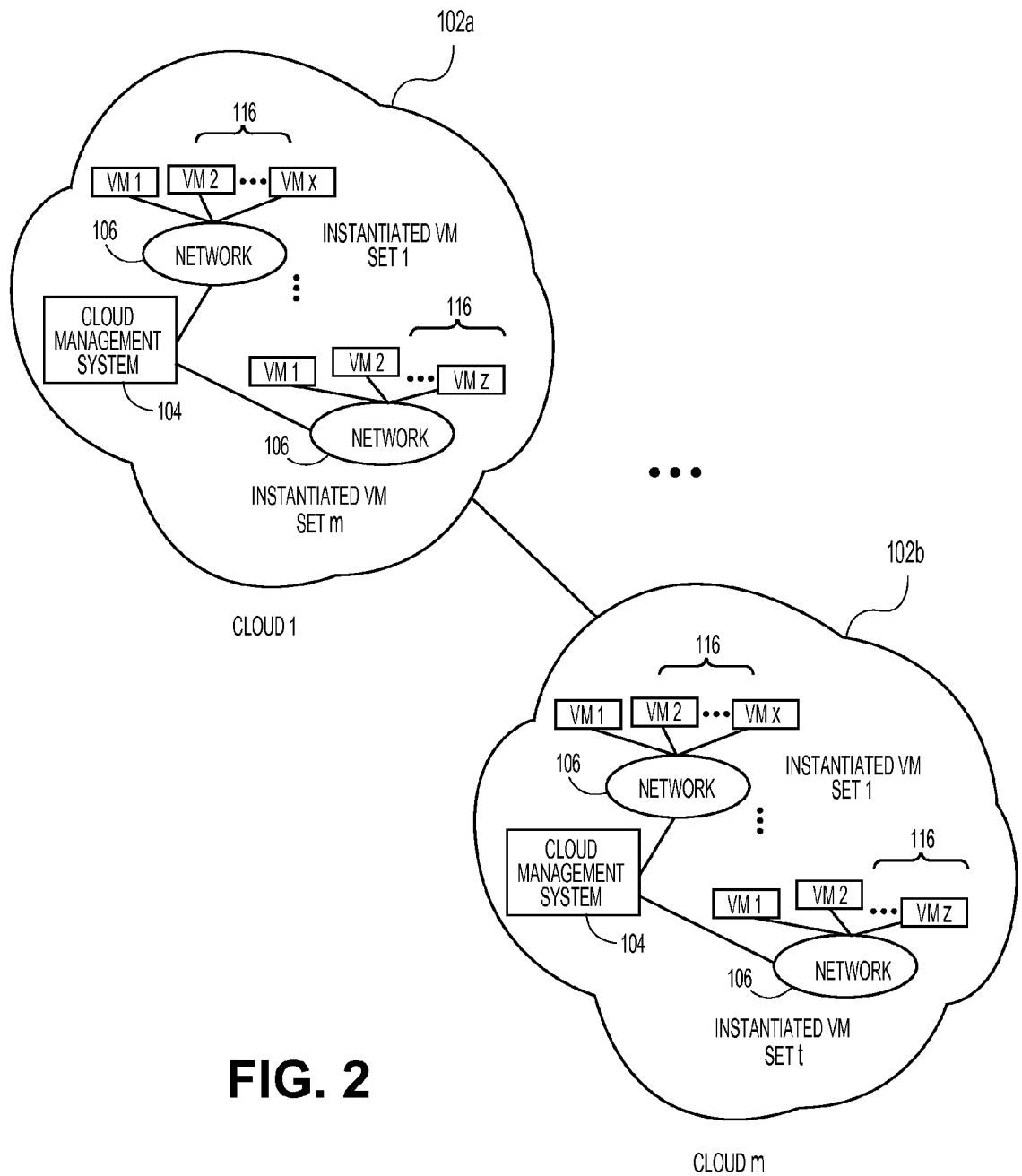
FIG. 2 illustrates an overall cloud system architecture in which various aspects of systems and methods for generating cloud deployment targets based on predictive workload estimation can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Figure 3:
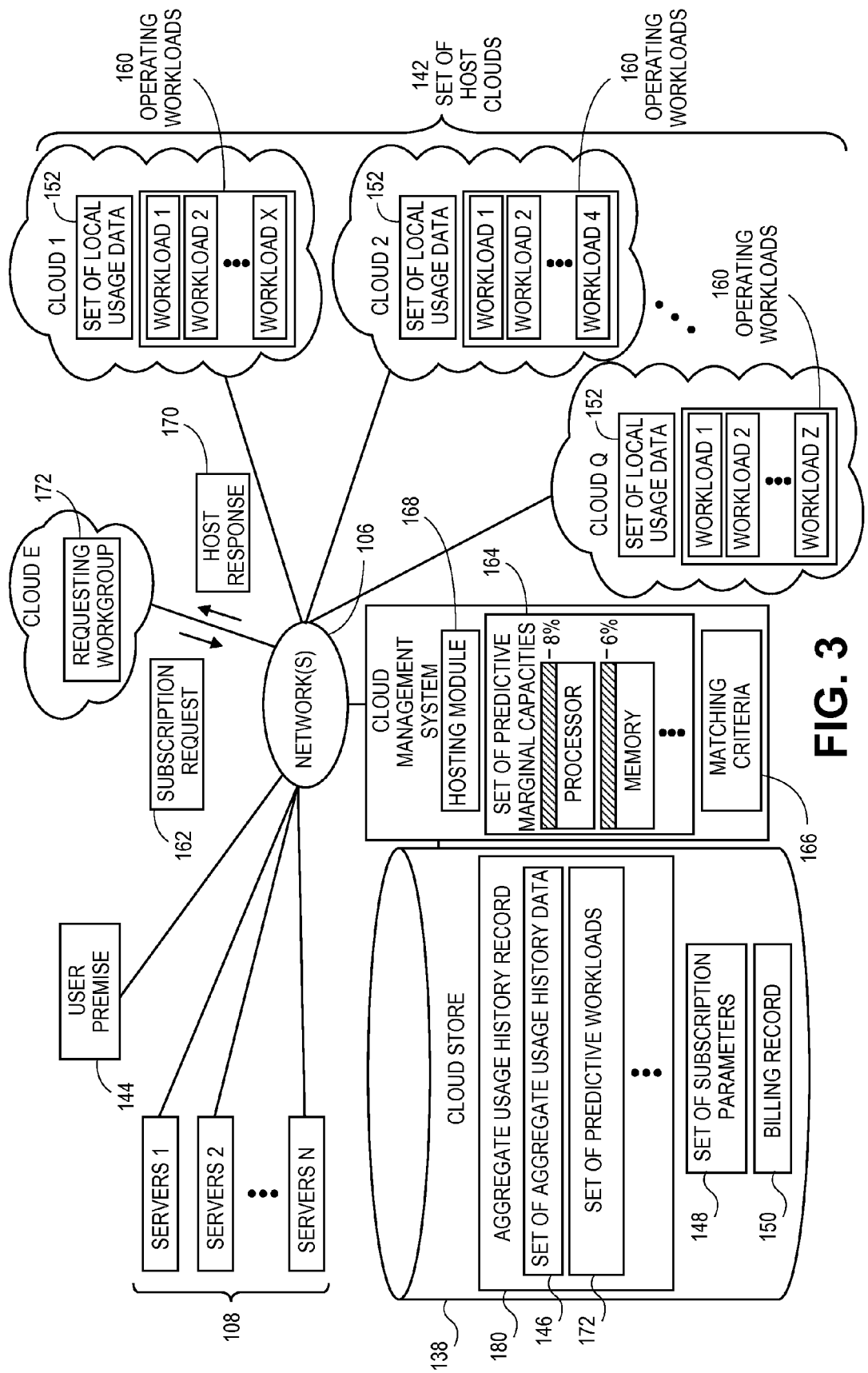
FIG. 3 illustrates a network configuration in which marginal cloud resource capacities can be identified, harvested, and bundled for used by additional workloads, according to various embodiments.

In aspects, a set of host clouds 142 can host a set of existing or already-operating workloads for users who have subscribed to cloud-based network services and operations. According to embodiments, trends or patterns of resource consumption in those existing workloads can present the operator of the set of host clouds 142 with an opportunity to capture or harvest under-utilized cloud resources, to possibly support additional workload subscriptions. In those regards, FIG. 3 shows an illustrative network configuration in which systems and methods for generating cloud deployment targets based on predictive workload estimation can be implemented, according to various embodiments. In embodiments as shown, one or more users can operate a user premise 144, such as a local area network with a set of client machines, and/or other machines or resources. In aspects, the user can in addition or instead operate one or more sets of virtual machines, appliances, and/or other virtual entities (not shown) in a set of host clouds 142. According to aspects, the set of users can execute or operate a set of operating workloads 160, including the execution of applications, services, transactions, data operations, and/or other activities generally hosted in the set of host clouds 142. In terms of support of the set of operating workloads 160, the set of host clouds 142 can include a set of diverse and/or otherwise unrelated cloud-based networks to which the user or users can subscribe for various resources under various subscription terms, criteria, service level agreements, and/or other conditions, which can be recorded or reflected in a set of subscription parameters 148. The set of subscription parameters 148 can for instance be stored in the cloud store 138 hosted or accessed by a cloud management system 104, and/or in other storage resources or locations.

In aspects, the consumption of resources in the set of host clouds 142, the assignment of user workloads in the set of operating workloads 160 to specific support servers in the set of support servers 108, generation of related billing events, and other workload and subscription-related activities can be tracked and managed by the hosting module 168, which can be hosted in the cloud management system 104 and/or in other locations, resources, or services. According to aspects, the hosting module 168 can communicate with the set of resource servers 108 including hardware support servers, and/or other resource providers, such as the vendors of software such as operating systems, applications, utilities, and/or other programs, services, and/or related resources. The cloud management system 104 can maintain part or all of the terms, conditions, limits, criteria, stipulations, and/or other parameters of the user's subscription to one or more resources hosted or provisioned in the set of host clouds 142 governing the set of operating workloads 160, and for instance reflected in the set of subscription parameters 148. In embodiments, the relationship between the user premise 144 when present and the set of host clouds 142 can be configured to operate on a rollover or failover basis, for instance, to provide instances of virtual machines for the user when the installed hardware and associated resources of the user premise 144 is insufficient to support immediate processing, throughput, and/or other demands.

In aspects, the user can operate and the set of operating workloads 160 can employ or use virtual machines, virtual appliances, and/or other entities in the set of host clouds 142, and each host cloud in the set of host clouds 142 can capture and store a set of local usage data 152 reflecting those operations. The set of local usage data 152 can record the consumption or use of resources in a local host cloud in the set of host clouds 142, such as the number of instances of software including operating systems and applications, processor resources, memory resources, communications resources, storage resources, and/or other elements or resources. The cloud management system 104, hosting module 168, and/or other logic or service can periodically receive the set of local usage data 152 and/or updates to that information from one or more host clouds in the set of host clouds 142. The receipt of the set of local usage data 152 or any portion of the set of local usage data 152 can be performed in aspects on a pull or demand basis, where the hosting module 168 and/or other logic can issue commands or instructions to one or more host clouds in the set of host clouds 142, and receive that data back from the interrogated cloud or clouds. In aspects, the set of local usage data 152 can be transmitted to the hosting module 168 on a push basis, for instance, on a predetermined, event-triggered, and/or other basis initiated by one or more of the host clouds in set of host clouds 142, themselves. Other channels, schedules, and techniques for the collection of the set of local usage data 152 from any one or more of the set of host clouds 142 can be used.

After receipt of the set of local usage data 152, any portion or component of the set of local usage data 152, and/or updates to the same, the hosting module 168 can collect and aggregate the set of local usage data 152 from the various host clouds and organize that data in a set of aggregate usage history data 146. The set of aggregate usage history data 146 can reflect recent and/or accumulated usage consumption by the subject user(s) and/or set of operating workloads 160 in all of the set of host clouds 142, over comparatively short-term periods or intervals such as minutes, one or more hours, one day, a number of days, a week, and/or over other periods. In aspects, the hosting module 168 can collect the set of local usage data 152 regardless of whether each of those clouds is configured to communicate with each other or not. In aspects, the set of aggregate usage history data 146 can present to the hosting module 168 and/or other logic the combined resource consumption by the user across the user premise 144 and/or all operating virtual machines, workloads, and/or other entities in the set of host clouds 142, on an hour-by-hour and/or other relatively short-term basis.

In aspects, cloud management system 104, the hosting module 168, and/or other logic or service can operate on the set of aggregate usage history data 146 to generate predictive trendlines for the consumption of resources of the set of host clouds 142 by the set of operating workloads 160. In aspects, a pattern of under-utilization of some resources by some users and/or workloads during certain periods may create an opportunity to capture or exploit those temporary marginal capacities for use by other users and/or workloads. In this fashion, unexploited and/or under-utilized resources of the set of host clouds 142 can be leveraged for more efficient operation.

In further aspects according to the present teachings, the cloud management system 104, hosting module 168, and/or other logic or service can examine the set of operating workloads 166, set of aggregate usage history data 146, and/or other information and generate a set of predicted marginal capacities 164 for resources in the set of host clouds 142. The hosting module 168 and/or other application, logic, and/or service can examine the set of aggregate usage history data 146 and determine, for instance, that a first user operating Workload 4 in cloud ID 6 demonstrates periods of high transaction frequency and communications bandwidth during the period of 3:00 p.m. to 11:00 p.m. on weekdays, with a significant reduction in consumption of those resources outside of those times on all days. The hosting module 168 and/or other logic, application, and/or service can calculate or identify a marginal capacity, for instance, of 8% of Web transaction rates and communications bandwidth that are projected to be freed up during that recurring period, and make those resources available for contribution to other workloads and/or users as part of the set of predictive marginal capacities 164 for that interval. Other resources can be tracked, estimated or projected, and incorporated into the set of predictive marginal capacities 164.

Once the hosting module 168 and/or other application, logic, and/or service has generated the set of predictive marginal capacities 164 for one or more periods, the hosting module 168 and/or other application, logic, and/or service can allocate or offer those resources to new or existing users or workloads, for additional workload hosting purposes. In embodiments, the deployment or potential offering of those captured resources can take place by way of the receipt of a subscription request 162 received from a requesting workload 172. In aspects, the requesting workload 172 can be or include an existing user of the set of host clouds 142, a new potential user of the set of host clouds 142, a rollover user, and/or other users and/or associated workloads. In aspects, the subscription request 162 can specify one or more resources required by the requesting workload for a new deployment and/or workload migration. In aspects, the subscription request 162 can be or include specifications or criteria such as, for instance, any one or more of a subscription cost, a minimum number of software images to be deployed in the set of host clouds 142, a maximum number of software images to be deployed in the set of set of host clouds 142, an operating system specification, a software application specification, a minimum processor throughput specification, a maximum processor throughput specification, a minimum memory amount specification, a maximum memory amount specification, a minimum storage capacity specification, a maximum storage capacity specification, a minimum bandwidth specification, a maximum bandwidth specification, a minimum set of communications ports specification, a maximum set of communications ports specification, an appliance specification, a service level agreement specification, and/or any services in support of any of the foregoing, as well as other services provided via the set of host clouds 142 to support the requesting workload 172.

After receipt of the subscription request 162, the hosting module 168 and/or other application, logic, and/or service can generate a comparison between the specifications of the subscription request 162 and the set of predictive marginal capacities 164, to determine whether or to what degree the resources predicted to be available for capture in the set of host clouds 142 match those requested in the subscription request 162. As part of that calculation, the hosting module 168 and/or other application, logic, and/or service can, in embodiments, access and/or receive a set of matching criteria 166 to apply to the comparison between the subscription request and the set of predictive marginal capacities 164. The set of matching criteria 166 can indicated, for example, that in order for a satisfactory match to the subscription request 162 to be established, each requested resource must be match to a level of at least 97%, with an overall reduction of the cost of subscription for the requesting workload 172 of at least 2%. Other functions, thresholds, and/or criteria can be used. After completing an analysis of the potential of one or more of the set of host clouds 142 to host the requesting workload 172, the hosting module 168 and/or other application, logic, and/or service can transmit a host response 170 to the requesting workload 172 and/or other entity. The host response 170 can for instance be or include an offer to host the requesting workload 172 in Cloud Ids 3 and 4 at a specified level of processor, memory, and storage capacity for the intervals of 12:00 midnight to 6:00 a.m. on weekdays, and/or other details of the potential hosting arrangement in the set of host clouds 142. Upon acceptance by the requesting workload 172 of the host response, the requesting workload 172 can be transferred or migrated to the one or more clouds in the set of host clouds 142 whose marginal resource capacities will be used to support the requesting workload 172.

Figure 4:
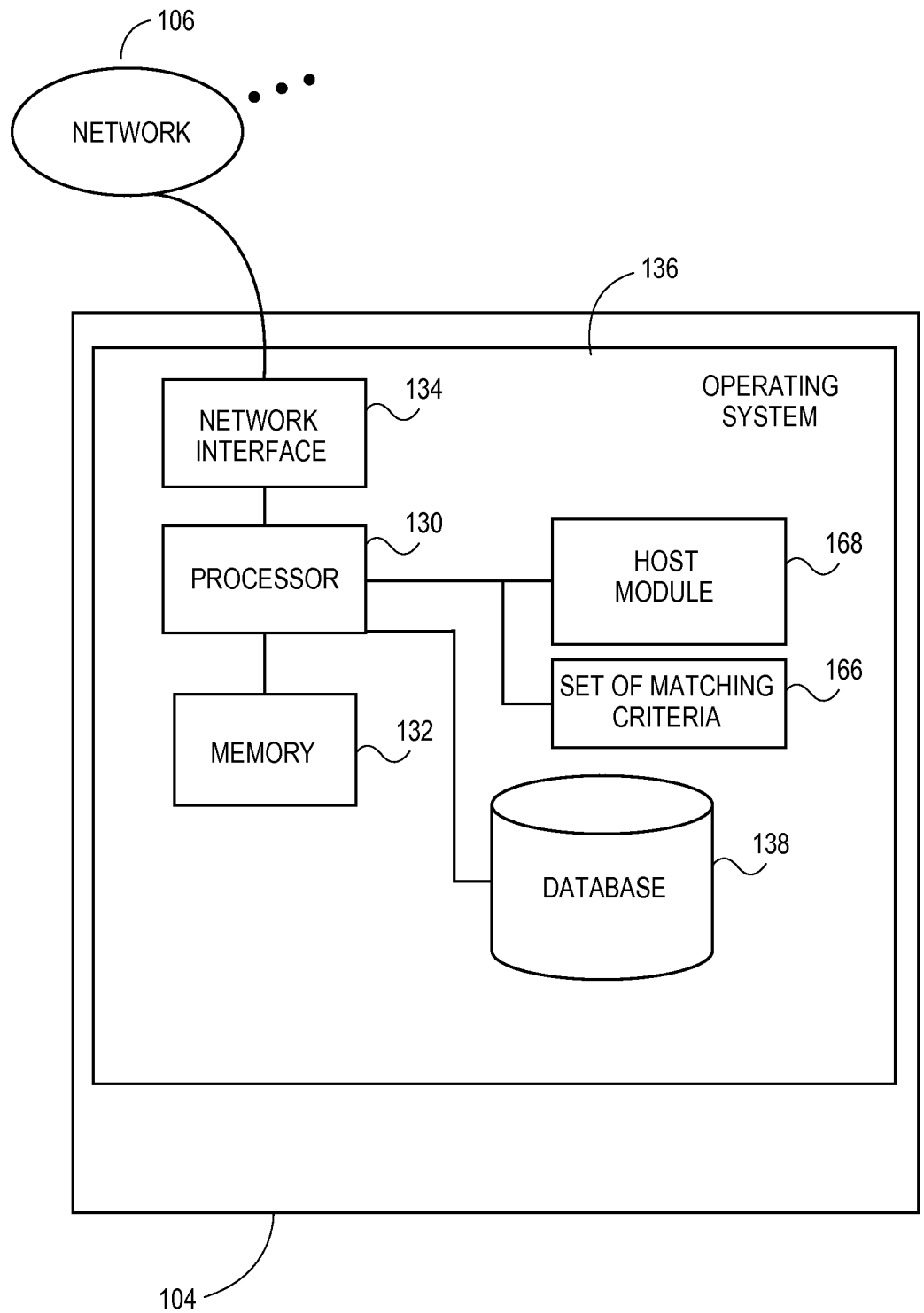
FIG. 4 illustrates an exemplary hardware configuration for a cloud management system that can support and maintain one or more cloud-based networks, according to various embodiments.

FIG. 4 illustrates an exemplary diagram of hardware and other resources that can be incorporated in a cloud management system 104 configured to communicate with the set of instantiated virtual machines 116, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of target clouds 152, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with hosting module 168, and/or other interfaces, applications, services, and/or logic. Other configurations of the cloud management system 104, associated network connections, and other hardware, software, and service resources are possible. It may be noted that in embodiments, the set of resource servers 108, and/or other hardware machines, platforms, or engines can comprise the same or similar resources as cloud management system 104, or can be configured with different hardware and software resources.

Figure 5:
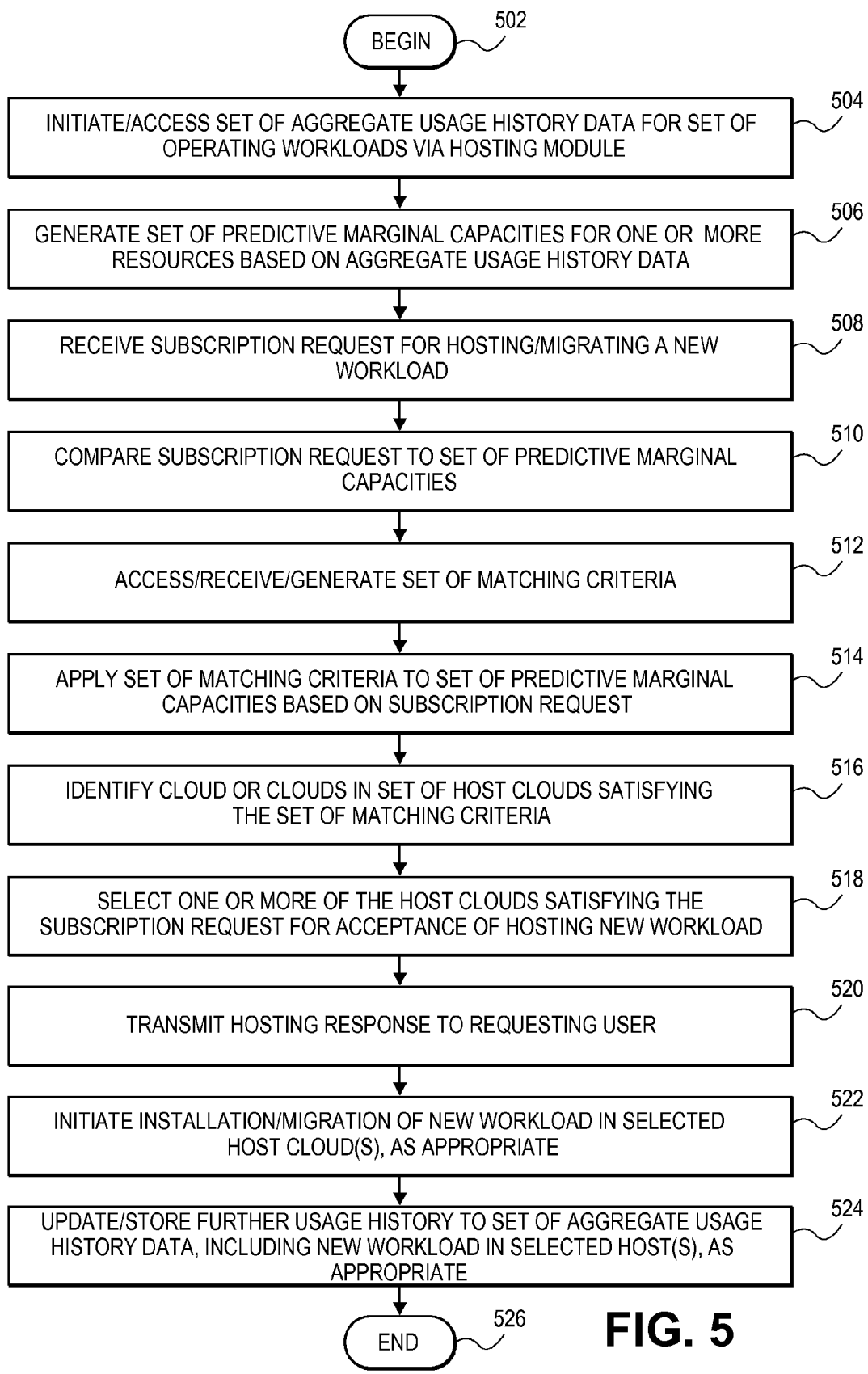
FIG. 5 illustrates a flowchart for the generation of predictive marginal capacities and related processing by host clouds and other entities, according to various embodiments.

FIG. 5 illustrates a flowchart of overall processing to perform various processing to identify and manage available marginal resource capacities for workload deployments, according to various embodiments of the present teachings. In 502, processing can begin. In 504, an administrator and/or other user can initiate and/or access the set of aggregate usage history data 146 for one or more client machines and/or the set of operating workloads 160 hosted in the set the in set of host clouds 142 and/or other environments. In 606, a set of predictive marginal capacities 164 can be generated for one or more clouds in the set of host clouds 142. In aspects, the set of predictive marginal capacities 164 can reflect the projected, estimated, and/or projected additional resources that a cloud host expects to have free or available after consumption of cloud resources by the one or more of the set of operating workloads 160. In aspects, the set of predictive marginal capacities 164 can be generated or calculated by the hosting module 168 and/or other logic, service or application operating on the set of aggregate usage history data 164 to identify consumption patterns exhibited by the set of operating workloads 160, and locate periods or conditions where one or more of the operating workloads tend to display a reduction in resource consumption.

Thus, merely for example, a first user operating Workload 1 in cloud ID 5 can demonstrate periods of strong processor and memory consumption during the hours of 8:00 a.m. to 9:00 p.m. on weekdays, but then a significant reduction in consumption of processor and memory consumption from 9:00 p.m. to 7:00 a.m. on those same days. The hosting module 168 and/or other logic, application, and/or service can calculate or identify a marginal capacity, for instance, of 5% of processor and memory allocations that are predicted to be freed up during those intervals or periods, and available for contribution to other workloads and/or users. In aspects, the hosting module 168 and/or other application, logic, and/or service can identify different types of resources, including for instance processor, memory, storage, communications, and/or other resources or services that may be available from different host clouds in the set of host clouds 142 over different intervals. In aspects, the set of predictive marginal capacities 164 can reflect the aggregated or combined marginal resource contributions of different host clouds for which different resource under-utilization may take place.

In aspects, the combined resources reflected in the set of predictive marginal capacities 164 can be organized in hourly, daily, and/or other time periods. It may be noted that in aspects, the set of predictive marginal capacities 164 can reflect predicted available excess capacities in different resources for different workloads in the set of operating workloads 160, independently of any subscription parameters that may apply to those workloads. In aspects in those regards and others, the hosting module 168 and/or other application, logic, and/or service can identify or "harvest" marginal projected differences between resources subscribed to by the set of operating workloads 160 and those which may become available due to temporary under-utilization, and combine those resources into the set of predictive marginal capacities 164 to make available to the requesting workload 172 and/or other user, workload, or entity.

In 508, the hosting module 168 and/or other application, logic, and/or service can receive a subscription request 162 for hosting and/or migrating a new workload from a requesting workload 172. In aspects, the subscription request 162 can specify a set of minimum and/or desired resources requested to host the requesting workload 172, including, for instance, processor, memory, storage, communications, and/or other resources or services In 510, the hosting module 168 and/or other application, logic, and/or service can compare the subscription request 162 to the set of predictive marginal capacities 164, to determine whether various requested baseline resource levels can be met, partially met, or not met by the set of predictive marginal capacities 164 predicted to be available from the set of host clouds 142. In 512, the hosting module 168 and/or other application, logic, and/or service can access, receive, and/or generate the set of matching criteria 166, indicating thresholds, weights, minimums, and/or other criteria that can be applied to the comparison between the subscription request 162 and set of predictive marginal capacities 164 to determine the existence or strength of a host resource match. For example, the set of matching criteria 166 can indicate that a minimum of 105% match between all requested resources and resources identified in the set of predictive marginal capacities 164 must be present in order to make a selection of one or more host clouds in the set of host clouds 142. Other criteria can be used in the set of matching criteria 166.

In 514, the hosting module 168 and/or other application, logic, and/or service can apply the set of matching criteria 166 to the set of predictive marginal capacities 164 based on comparison to the resource levels and/or other conditions specified in the subscription request 162. For instance, the set of matching criteria 166 can specify that a match of 100% of requested resources must be found at a net subscription cost that is 5% lower than the existing costs of the requesting workload 172, and the hosting module 168 and/or other application, logic, and/or service can determine that cloud ID 7 can meet the set of matching criteria 166 as specified for a subscription period identified in the subscription request 162. Other criteria or conditions can be used. In 516, the hosting module 168 and/or other application, logic, and/or service can identify the cloud or clouds in the set of host clouds 142 satisfying the set of matching criteria 166 and/or other conditions required for hosting the requesting workload 172. In 518, the hosting module 168 and/or other application, logic, and/or service can select one or more of the host clouds satisfying the subscription request 162 to accept the hosting of the requesting workload 172. In aspects, if just one host cloud is identified which satisfies all the set of matching criteria 166 and/or other conditions, that cloud may be identified as the new cloud host. In aspects, if more than one host cloud is identified which satisfies all the set of matching criteria 166 and/or other conditions, the hosting module 168 and/or other application, logic, and/or service can for instance apply tie-breaker rules to select one or more clouds, and/or can randomly choose between the qualifying host clouds. In aspects, the hosting module 168 and/or other application, logic, and/or service can in addition or instead transmit a query or dialog to the requesting workload 172 and/or associated user(s) to selected one or more qualified host cloud. In aspects, the selected one or qualified cloud or clouds in the set of host clouds 142 can be identified in the hosting response 170 and/or other message transmitted to the requesting workload 172 and/or associated user(s).

In 520, the hosting module 168 and/or other application, logic, and/or service can initiate the installation and/or migration of the requesting workload 172 to the selected host cloud or clouds in the set of host clouds 142, as appropriate. In 522, the hosting module 168 and/or other application, logic, and/or service can update and/or store further usage history data to the set of aggregate usage history data 146, including operation of the requesting workload 172 in the selected host cloud or clouds, as appropriate. In 524, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. Other resources described as singular or integrated can in embodiments be plural or distributed, and resources described as multiple or distributed can in embodiments be combined. The scope of the invention is accordingly intended to be limited only by the following claims.

The invention claimed is:

1. A method comprising:
receiving a subscription request to host a requested workload in a set of host clouds, wherein the subscription request comprises a subscription period associated with the requested workload;
accessing a usage history of a set of operating workloads currently hosted in the set of host clouds, the usage history comprising a record of consumption of resources consumed from the set of host clouds;
generating, by a processing device, a set of predictive marginal capacities for the set of host clouds in view of the usage history of the set of operating workloads;
applying, by the processing device, a set of matching criteria to the set of predictive marginal capacities and the subscription request, wherein the set of matching criteria comprises a cost reduction criteria indicating a minimum amount of resources to provide for satisfying the requested workload in view of a reduction in a subscription cost associated with the subscription request; and
generating, by the processing device in response to the request, a workload hosting response in view of a result of applying the set of matching criteria, wherein the workload hosting response indicates a confirmation of available resources to satisfy the requested workload during the subscription period.

2. The method of claim 1, wherein the subscription request comprises a set of minimum resource levels to be provided by the set of host clouds over the subscription period.

3. The method of claim 2, wherein the set of matching criteria comprises at least providing the set of minimum resource levels in view of the set of predictive marginal capacities for the subscription period.

4. The method of claim 3, wherein the set of matching criteria comprises at least providing a predefined margin above the set of minimum resource levels in view of the set of predictive marginal capacities for the subscription period.

5. The method of claim 1, wherein the set of predictive marginal capacities are in view of at least one resource predicted to be under-utilized by at least one of the set of operating workloads in view of the usage history.

6. The method of claim 5, wherein the set of predictive marginal capacities are in view of a plurality of resources predicted to be under-utilized by the at least one of the set of operating workloads in view of the usage history.

7. The method of claim 6, wherein the set of predictive marginal capacities are in view of a plurality of resources predicted to be under-utilized by at least two of the set of operating workloads in view of the usage history.

8. The method of claim 1, wherein the resources consumed from the at least one set of host clouds comprises at least one of processor resources, memory resources, storage resources, bandwidth resources, communications port resources, operating system resources, application resources, or appliance resources.

9. The method of claim 1, wherein the subscription request comprises at least one of a subscription cost, a minimum number of software images to be deployed in the set of host clouds, a maximum number of software images to be deployed in the set of host clouds, an operating system specification, a software application specification, a minimum processor throughput specification, a maximum processor throughput specification, a minimum memory amount specification, a maximum memory amount specification, a minimum storage capacity specification, a maximum storage capacity specification, a minimum bandwidth specification, a maximum bandwidth specification, a minimum set of communications ports specification, a maximum set of communications ports specification, an appliance specification, a service level agreement specification, clustering services, identity management services, backup services, security services, or billing and administrative services.

10. A system comprising:
an interface to a data store, the data store to store a resource usage history of a set of operating workloads in a set of host clouds, the resource usage history comprising a record of consumption of resources consumed from the set of host clouds; and
a processor, to communicate with the data store via the interface, the processor to:
receive a subscription request to host a requested workload in at least one of the set of host clouds, wherein the subscription request comprises a subscription period associated with the requested workload;
access a usage history of a set of operating workloads currently hosted in the set of host clouds, the usage history comprising a record of consumption of resources consumed from the set of host clouds;
generate a set of predictive marginal capacities for the set of host clouds in view of the usage history of the set of operating workloads;
apply a set of matching criteria to the set of predictive marginal capacities and the subscription request, wherein the set of matching criteria comprises a cost reduction criteria indicating a minimum amount of resources to provide for satisfying the requested workload in view of a reduction in a subscription cost associated with the subscription request; and
generate a workload hosting response in response to applying the set of matching criteria, wherein the workload hosting response indicates a confirmation of available resources to satisfy the requested workload during the subscription period.

11. The system of claim 10, wherein the subscription request comprises a set of minimum resource levels to be provided by the set of host clouds over the subscription period.

12. The system of claim 11, wherein the set of matching criteria comprises at least providing the set of minimum resource levels in view of the set of predictive marginal capacities for the subscription period.

13. The system of claim 12, wherein the set of matching criteria comprises at least providing a predefined margin above the set of minimum resource levels in view of the set of predictive marginal capacities for the subscription period.

14. The system of claim 10, wherein the set of predictive marginal capacities are in view of at least one resource predicted to be under-utilized by at least one of the set of operating workloads in view of the usage history.

15. The system of claim 14, wherein the set of predictive marginal capacities are in view of a plurality of resources predicted to be under-utilized by the at least one of the set of operating workloads in view of the usage history.

16. The system of claim 15, wherein the set of predictive marginal capacities are in view of a plurality of resources predicted to be under-utilized by at least two of the set of operating workloads in view of the usage history.

17. The system of claim 10, wherein the resources consumed from the at least one set of host clouds comprises at least one of processor resources, memory resources, storage resources, bandwidth resources, communications port resources, operating system resources, application resources, or appliance resources.

18. The system of claim 10, wherein the subscription request comprises at least one of a subscription cost, a minimum number of software images to be deployed in the set of host clouds, a maximum number of software images to be deployed in the set of host clouds, an operating system specification, a software application specification, a minimum processor throughput specification, a maximum processor throughput specification, a minimum memory amount specification, a maximum memory amount specification, a minimum storage capacity specification, a maximum storage capacity specification, a minimum bandwidth specification, a maximum bandwidth specification, a minimum set of communications ports specification, a maximum set of communications ports specification, an appliance specification, a service level agreement specification, clustering services, identity management services, backup services, security services, or billing and administrative services.

19. The method of claim 1, wherein available resources to satisfy the requested workload are available for a determined time period within the subscription period.

20. A non-transitory computer-readable medium including executable instructions that, when executed by a processing device, cause the processing device to:
receive, by the processing device, a subscription request to host a requested workload in at least one of a set of host clouds, wherein the subscription request comprises a subscription period associated with the requested workload;
access a usage history of a set of operating workloads currently hosted in the set of host clouds, the usage history comprising a record of consumption of resources consumed from the set of host clouds;
generate a set of predictive marginal capacities for the set of host clouds in view of the usage history of the set of operating workloads;
apply a set of matching criteria to the set of predictive marginal capacities and the subscription request, wherein the set of matching criteria comprises a cost reduction criteria indicating a minimum amount of resources to provide for satisfying the requested workload in view of a reduction in a subscription cost associated with the subscription request; and
generate a workload hosting response in response to applying the set of matching criteria, wherein the workload hosting response indicates a confirmation of available resources to satisfy the requested workload during the subscription period.

21. The method of claim 1, wherein the reduction in the subscription cost associated with satisfying the requested workload meets a determined percentage threshold.

* * * * *